(12) United States Patent  
Ahad

(10) Patent No.: US 8,047,613 B1
(45) Date of Patent: Nov. 1, 2011

(54) CUSHION-LESS AIRCRAFT SEAT

(75) Inventor: Sam J. Ahad, Newhall, CA (US)

(73) Assignee: TIMCO Aviation Services, Inc., Greensboro, NC (US)

( * ) Notice: Subject to any disclaimer, the term of this patent is extended or adjusted under 35 U.S.C. 154(b) by 213 days.

(21) Appl. No.: 12/273,929

(22) Filed: Nov. 19, 2008

(51) Int. Cl.
A47C 7/02 (2006.01)
A47B 83/02 (2006.01)

(52) U.S. Cl. ............... 297/452.14; 297/163; 297/452.18

(58) Field of Classification Search ............. 297/452.13, 297/452.14, 451.3, 450.1, 163, 452.18
See application file for complete search history.

(56) References Cited

U.S. PATENT DOCUMENTS

| 2,523,960 | A |   | 9/1950  | Liljengren ........................ 297/43 |
| 2,604,930 | A |   | 7/1952  | Dean et al. ..................... 297/170 |
| 2,606,727 | A |   | 8/1952  | De Haven ................... 244/118.6 |
| 2,861,624 | A |   | 11/1958 | Anderson ........................ 297/43 |
| 3,102,754 | A |   | 9/1963  | Junkunc ........................ 297/162 |
| 3,145,052 | A |   | 8/1964  | Morgan ........................ 297/354 |
| 3,392,954 | A |   | 7/1968  | Malitte .......................... 248/429 |
| 3,580,630 | A |   | 5/1971  | Fetter ............................. 297/125 |
| 3,583,760 | A |   | 6/1971  | McGregor ..................... 297/145 |
| 3,730,019 | A |   | 5/1973  | Ballard ............................ 74/502 |
| 4,105,177 | A |   | 8/1978  | Smith et al. .................... 248/564 |
| 4,215,841 | A |   | 8/1980  | Herring ........................... 248/635 |
| 4,354,398 | A |   | 10/1982 | Porter .............................. 74/501 |
| 4,375,300 | A | * | 3/1983  | Long et al. ..................... 297/232 |
| 4,376,522 | A |   | 3/1983  | Banks ......................... 248/503.1 |
| 4,498,649 | A |   | 2/1985  | Toll ............................. 244/118.6 |
| 4,509,888 | A |   | 4/1985  | Sheek ............................ 410/105 |
| 4,526,421 | A |   | 7/1985  | Brennan et al. ................ 297/232 |
| 4,634,182 | A |   | 1/1987  | Tanaka ........................... 297/379 |
| 4,662,676 | A |   | 5/1987  | Havelock ....................... 297/194 |
| 4,723,732 | A |   | 2/1988  | Gorges ....................... 244/118.6 |
| 4,771,969 | A |   | 9/1988  | Dowd ......................... 244/118.6 |
| 4,796,837 | A |   | 1/1989  | Dowd ......................... 244/122 R |
| 4,856,738 | A |   | 8/1989  | Martin ....................... 244/122 R |
| 4,881,702 | A | * | 11/1989 | Slettebak .................... 244/118.6 |
| 4,887,864 | A |   | 12/1989 | Ashton ........................... 297/375 |
| 4,932,816 | A |   | 6/1990  | Ligensa ........................ 410/105 |
| 4,944,552 | A |   | 7/1990  | Harris ........................... 297/145 |
| 4,989,766 | A | * | 2/1991  | Lewallyn et al. ............. 224/155 |
| 5,000,511 | A |   | 3/1991  | Shichijo et al. .......... 297/188.05 |
| 5,029,822 | A |   | 7/1991  | Selzer ......................... 267/64.12 |
| 5,037,157 | A |   | 8/1991  | Wain et al. ................ 297/188.18 |
| 5,058,829 | A |   | 10/1991 | Bentley ......................... 244/122 |
| 5,083,726 | A |   | 1/1992  | Schurr ....................... 244/118.6 |
| 5,169,091 | A |   | 12/1992 | Beroth ....................... 244/122 R |
| 5,177,616 | A |   | 1/1993  | Riday .............................. 348/837 |
| 5,178,346 | A |   | 1/1993  | Beroth ....................... 244/122 R |
| 5,180,120 | A |   | 1/1993  | Simpson et al. ........... 244/118.6 |
| D333,420  | S |   | 2/1993  | Bales et al. ..................... D8/349 |
| 5,193,765 | A |   | 3/1993  | Simpson et al. ........... 244/118.6 |
| 5,224,755 | A | * | 7/1993  | Beroth ....................... 297/216.1 |
| 5,284,379 | A |   | 2/1994  | Arnold et al. ................. 297/113 |
| 5,316,369 | A |   | 5/1994  | Kanda ...................... 297/188.15 |

(Continued)

Primary Examiner — Sarah B McPartlin
(74) Attorney, Agent, or Firm — MacCord Mason PLLC

(57) ABSTRACT

A cushion-less passenger seat. The passenger seat includes spaced left and right spreaders, each having a front and rear leg with top and bottom ends and a seating surface formed from a flexible bottom diaphragm attached to and extending between the left and right spreaders. The passenger seat also includes a lumbar support having lower and upper sections and front and back sides formed from a flexible diaphragm. The lower section of the lumbar support is attached to and between the left and right spreaders. The lumbar support upper section extends upwardly above the seat's rear legs and seating surface.

41 Claims, 2 Drawing Sheets

U.S. PATENT DOCUMENTS

| | | | | |
|---|---|---|---|---|
| 5,333,818 A | | 8/1994 | Brandt et al. | 244/118.6 |
| 5,337,979 A | | 8/1994 | Bales et al. | 244/118.1 |
| 5,374,104 A | | 12/1994 | Moore et al. | 297/188.16 |
| 5,383,630 A | | 1/1995 | Flatten | 244/118.6 |
| 5,425,516 A | | 6/1995 | Daines | 244/118.6 |
| 5,449,132 A | | 9/1995 | Gilbert | 244/122 |
| 5,451,092 A | | 9/1995 | Gray | 297/122 |
| 5,489,172 A | | 2/1996 | Michler | 410/105 |
| 5,553,923 A | * | 9/1996 | Bilezikjian | 297/452.2 |
| 5,558,391 A | | 9/1996 | Chavous | 297/153 |
| 5,564,654 A | | 10/1996 | Nordstrom | 244/118.1 |
| 5,651,587 A | | 7/1997 | Kodaverdian | 297/423.36 |
| 5,695,240 A | * | 12/1997 | Luria | 297/163 |
| 5,722,722 A | | 3/1998 | Massara | 297/216.13 |
| 5,762,296 A | | 6/1998 | Gilbert | 244/118.1 |
| 5,765,911 A | | 6/1998 | Sorenson | 297/173 |
| 5,787,562 A | * | 8/1998 | Penley | 29/402.08 |
| 5,794,470 A | | 8/1998 | Stringer | 70/261 |
| 5,800,013 A | * | 9/1998 | Branham et al. | 297/232 |
| 5,806,932 A | | 9/1998 | Zhuang | 297/361.1 |
| 5,810,290 A | | 9/1998 | Merensky et al. | 244/118.6 |
| 5,871,259 A | | 2/1999 | Gehart | 297/362.12 |
| 5,871,318 A | | 2/1999 | Dixon et al. | 410/105 |
| 5,887,949 A | | 3/1999 | Kodaverdian | 297/423.36 |
| 5,890,765 A | | 4/1999 | LaPointe et al. | 297/354.13 |
| 5,992,798 A | | 11/1999 | Ferry | 244/118.6 |
| 6,003,394 A | | 12/1999 | Heckel, Jr. | 74/89.15 |
| 6,019,429 A | | 2/2000 | Tedesco | 297/328 |
| 6,086,155 A | | 7/2000 | Stiffler | 297/362 |
| 6,106,067 A | | 8/2000 | Zhuang et al. | 297/361.1 |
| 6,119,980 A | | 9/2000 | Ferry | 244/122 R |
| 6,176,547 B1 | | 1/2001 | Fran.cedilla.ois et al. | 297/257 |
| 6,260,813 B1 | * | 7/2001 | Whitcomb | 248/503.1 |
| 6,279,416 B1 | | 8/2001 | Busholtz et al. | 74/501.5 |
| 6,547,323 B1 | | 4/2003 | Aitken et al. | 297/113 |
| 6,601,798 B2 | | 8/2003 | Cawley | 244/118.6 |
| 6,669,295 B2 | | 12/2003 | Williamson | 297/362.13 |
| 6,672,661 B2 | * | 1/2004 | Williamson | 297/232 |
| 6,749,266 B2 | * | 6/2004 | Williamson | 297/452.2 |
| 6,793,282 B2 | | 9/2004 | Plant et al. | 297/248 |
| 6,799,805 B2 | * | 10/2004 | Johnson | 297/452.2 |
| 6,863,344 B2 | | 3/2005 | Smallhorn | 297/217.3 |
| 6,902,365 B1 | | 6/2005 | Dowty | 410/105 |
| 7,021,596 B2 | | 4/2006 | Lory | 248/429 |
| 7,066,551 B2 | | 6/2006 | Johnson | 297/452.18 |
| 2004/0415225 | | 7/2004 | Alter | 297/367 |
| 2005/0133666 A1 | | 6/2005 | Zerner | 244/118.6 |
| 2006/0091707 A1 | | 5/2006 | Ahad | 297/145 |
| 2006/0102784 A1 | | 5/2006 | Callahan et al. | 244/118.6 |

* cited by examiner

CUSHION-LESS AIRCRAFT SEAT

BACKGROUND OF THE INVENTION (1) Field of Invention

The present invention relates generally to an improved seating apparatus for an aircraft and, more particularly, to an economy class seat for passenger aircraft.

(2) Description of the Prior Art

Commercial airlines are constantly under pressure to cut costs pertaining to the procurement, maintenance and operation of fleet aircraft. One of the areas that airlines look to for cost cuts are the passenger seats used in the aircraft making up their fleet. For example, increased efficiencies are realized with the ability to seat more passengers per flight. For this reason it is important to minimize the front to back distance (i.e., pitch) between rows of seats. Moreover, keeping the weight of the seats low allows more passengers to be seated per flight.

Thus, there remains a need for an improved aircraft seat that is super lightweight while, at the same time, also provides greater perceived space at a relatively close pitch.

SUMMARY OF THE INVENTION

The present invention is directed to an improved passenger seat that is super lightweight and that also provides greater perceived space at a relatively close pitch (i.e., 28"-30"). In general, the invention is a cushion-less passenger seat having left and right spreaders, each having a front and rear leg with top and bottom ends and a seat surface formed from a flexible bottom diaphragm (i.e., seat pan) attached to and extending between the left and right spreaders. These primary structural components are preferably constructed from machined aluminum. As such, the present invention is assembled without welding and without sheet metal. Furthermore, the cushion-less passenger seat of the present invention offers higher reliability and very low cost of ownership due to fewer moving parts than conventional designs. Further still, the flexible back and bottom diaphragms provide high comfort without needing back or bottom cushions. Moreover, the present invention eliminates the need for hydromechanical locking cylinders (i.e., hydrolocks) and associated valves. Recline control buttons are also eliminated.

In particular, the seat includes a lumbar support with lower and upper sections and front and back sides formed from a flexible diaphragm. The lower section of the lumbar support is attached to and between the left and right spreaders. The lumbar support upper section extends upwardly above the seat's rear legs and seating surface. Moreover, the cushion-less passenger seat further includes a headrest with a top and bottom. The bottom of the headrest is attached to the lumbar support upper section. The headrest extends substantially upward from the lumbar support upper section. It is preferred that the combined length of the lumbar support from the lumbar lower section to the headrest top is at least forty-five inches above the floor level to which the seat is attached. However, the cushion-less passenger seat of the present invention can also be realized with a short-back structure having a combined headrest and lumbar support of up to only forty-three inches above the floor level to which the seat is attached.

The cushion-less passenger seat of the present invention also includes left and right armrests having distal and proximal ends. The armrests proximal ends are pivotally attached to the left and right spreaders respectively. The armrests have raised positions that extend upwardly and are parallel with the lumbar support surface. Moreover, the armrests have lowered positions that extend parallel with and adjacent to the seating surface.

Angled struts attach to and extend downwardly from the top end of each front leg to the bottom end of each rear leg. Bottom horizontal struts extend from the bottom of each front leg to the bottom of each rear leg. These struts add significant strength to the passenger seat assembly while at the same time maintaining the cushion-less passenger seat's lightweight feature. Further still, anti-rattle track fittings are included for the bottom ends of both the front and rear legs. The front anti-rattle fittings are of the tool-less type, meaning that they are manually adjustable without the need for a wrench. The anti-rattle fittings on the rear leg are triple-studded for extra grip. Furthermore, the rear leg is planar having an arched shape that includes lightening holes located at low mechanical stress points for keeping the overall weight of the cushion-less seat low.

The cushion-less passenger seat further includes a seat back food tray having a proximal end pivotally attached to the back side of the lumbar support. The food tray has a horizontal position that extends away from the lumbar support backside and an upright position that extends upwardly parallel with the lumbar support. The preferred tray includes a belly room curvature and a forward or aft tray lip. A cup recess for holding a drinking cup can also be manufactured into the tray. Also, an optional integrated retractable cup holder can be included with the tray. Moreover, the preferred tray is around ten inches wide and can optionally include a toggle mechanism for eliminating the need for a seat back food tray latch. The seat back food tray can be of the pivoting or sliding type.

The seat back preferably also includes a literature box attached to and extending upwardly parallel with the headrest. The literature box can optionally include a spring-loaded pocket for firmly holding the literature in the box while the vehicle carrying the cushion-less seat is in motion.

The cushion-less passenger seat also includes a baggage bar having downwardly extending sections that are attached to the left and right spreaders near points where the rear legs attach to the spreaders. Forwardly extending sections of the baggage bar bend around the seat's front legs to extend across the space between the seat's front legs. The baggage bar is preferably manufactured from high strength anodized aluminum.

These and other aspects of the invention will become apparent to those skilled in the art after a reading of the following detailed description of the preferred embodiment when considered with the drawings.

DETAILED DESCRIPTION OF THE PREFERRED EMBODIMENT

Figure 1:
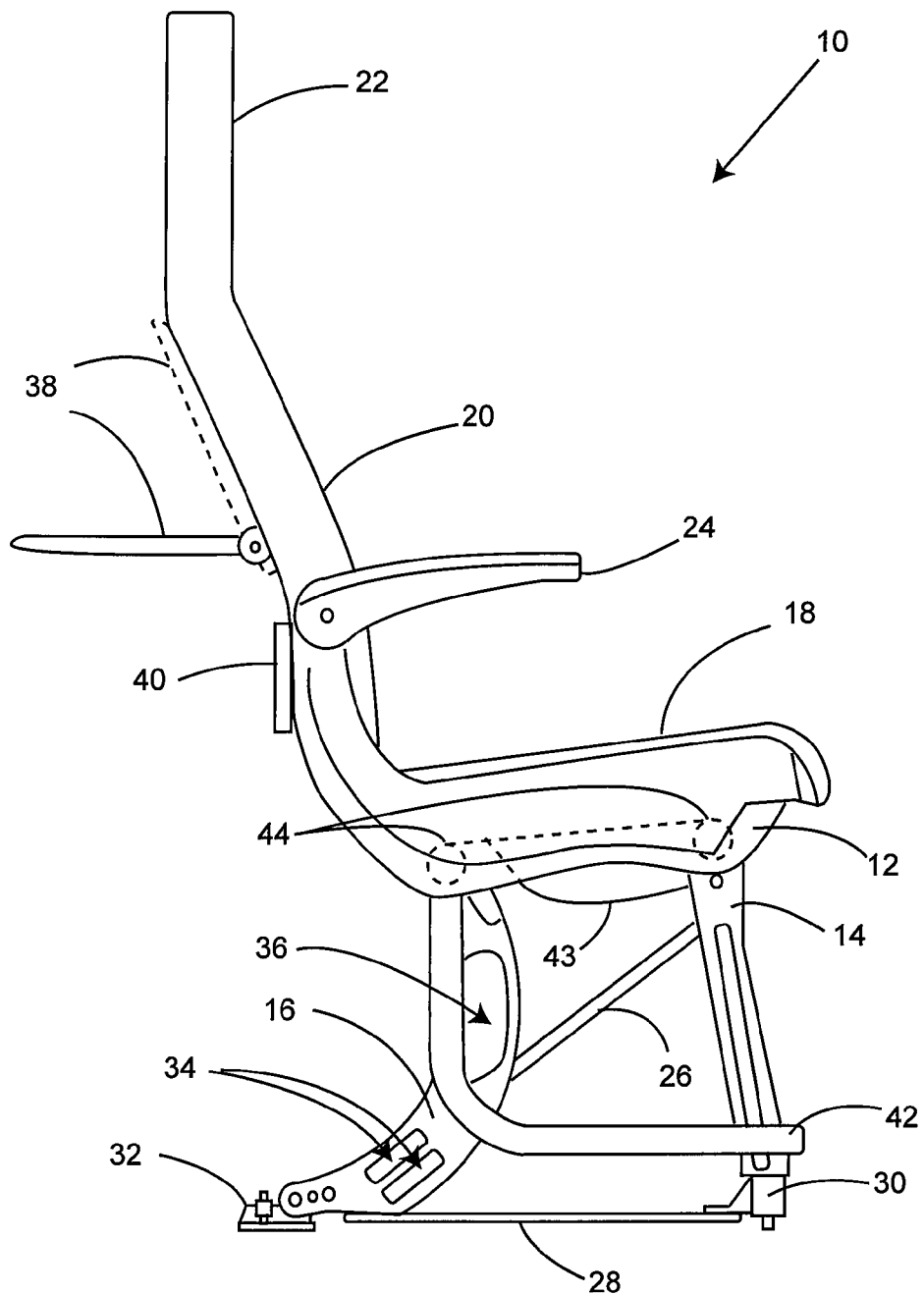
FIG. 1 is a right side view of the cushion-less passenger seat of the present invention.
Figure 2:
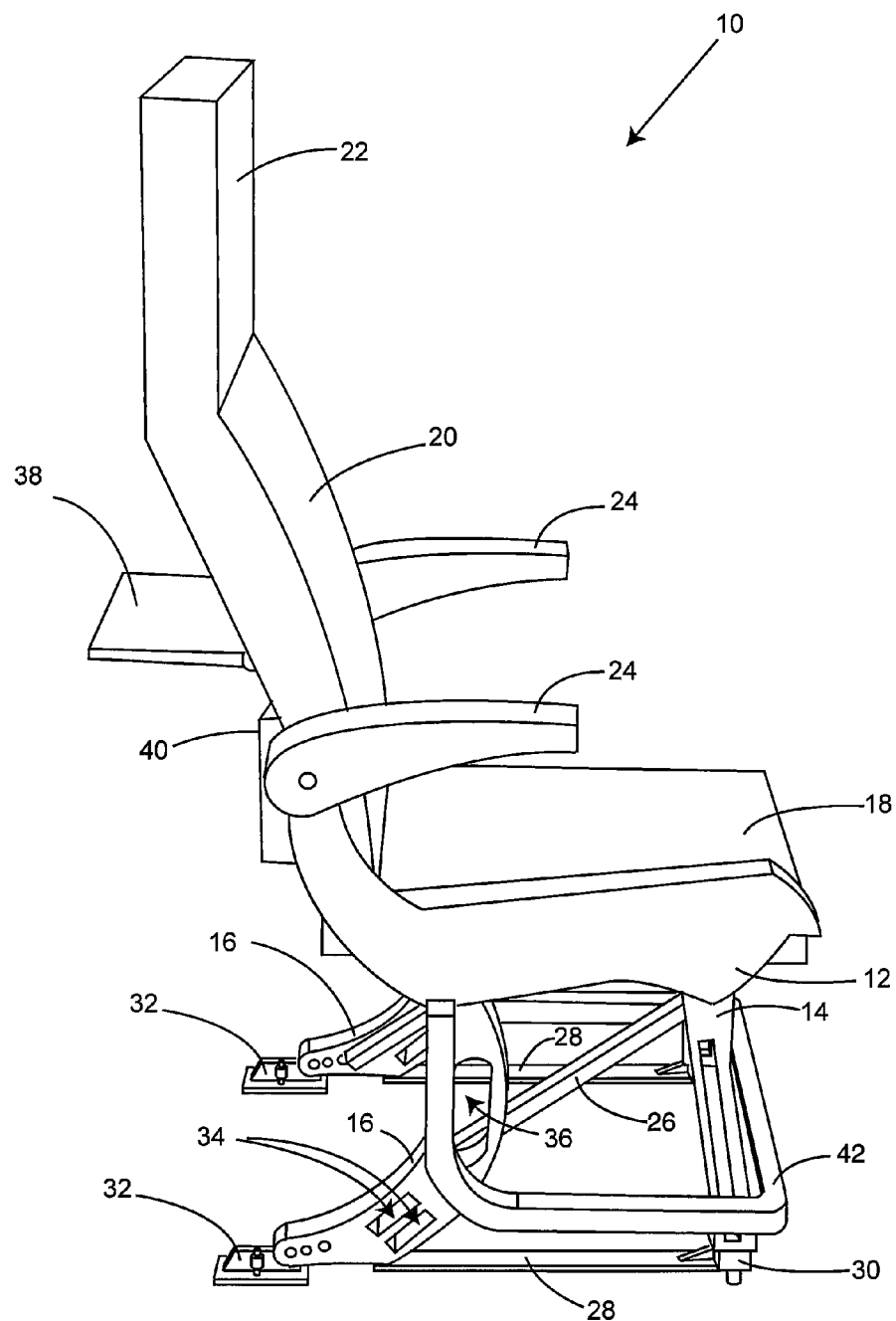
FIG. 2 is a perspective view of the cushion-less passenger seat of the present invention.

In the following description, like reference characters designate like or corresponding parts throughout the several views. Also in the following description, it will be understood that terms such as "forward", "rearward", "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a cushion-less passenger seat, generally designated 10, is shown constructed according to the present invention. The cushion-less passenger seat 10 having left and right spreaders 12, each having a front leg 14 and a rear leg 16 with top and bottom ends and a seat surface 18 formed from a flexible bottom diaphragm attached to and extending between the left and right spreaders.

Cushion-less seat 10 includes a lumbar support 20 with lower and upper sections and front and back sides formed from a flexible diaphragm. The lower section of lumbar support 20 is attached to and between the left and right spreaders 12 across a back frame. Lumbar support 20's upper section extends upwardly above rear legs 16 and seating surface 18. Moreover, the cushion-less passenger seat further includes a headrest 22 having a top and bottom. The bottom of headrest 22 is attached to lumbar support 20's upper section. Moreover, headrest 22 extends substantially upward from lumbar support 20's upper section.

Cushion-less passenger seat 10 includes left and right armrests 24 having distal and proximal ends. Armrests 24's proximal ends are pivotally attached to the left and right spreaders 12 respectively.

Angled struts 26 attach to and extend downwardly from the top end of each front leg 14 to the bottom end of each rear leg 16. Further still, bottom horizontal struts 28 extend from the bottom of each front leg 14 to the bottom of each rear leg 16.

Further still, anti-rattle track fittings 30 are included for the bottom end of front legs 14. Anti-rattle fittings 32 on the rear legs are triple-studded for extra grip. Furthermore, rear legs 16 are planar, each having an arched shape that includes lightening holes 34 and 36 located at low mechanical stress points for keeping the overall weight of cushion-less seat 10 low. It is preferred that the combined length of lumbar support 20 from the lumbar lower section to headrest 22's top is at least forty-five inches above a floor having tracks to which anti-rattle track fittings 30 and 32 are attached.

Cushion-less passenger seat 10 further includes a seat back food tray 38 having a proximal end pivotally attached to the back side of lumbar support 20. Food tray 38 has a horizontal position that extends away from the lumbar support back side and an upright position (shown in dashed lines) that extends upwardly parallel with lumbar support 20.

Headrest 22 includes a literature box 40 that is attached to and extends upwardly parallel with the headrest. The literature box 40 can optionally include a spring-loaded pocket for firmly holding the literature in the box while the vehicle carrying the cushion-less seat is in motion. Literature box 40 can be located at a lower level if desired.

Cushion-less passenger seat 10 also includes a baggage bar 42 having downwardly extending sections that are attached to left and right spreaders 12 near points where rear legs 16 attach to spreaders 12. Forwardly extending sections of baggage bar 42 bend around the seat's front legs 14 to extend across the space between the seat's front legs 14. Baggage bar 42 is preferably manufactured from high strength anodized aluminum. Moreover, a standard or tamper proof life vest pouch 43 can be strapped to seat 10 from a pair of spar tubes 44 via hook and loop fastener and/or zipties.

Certain modifications and improvements will occur to those skilled in the art upon a reading of the foregoing description. By way of example, a low profile cushion (approximately one-inch thick) can be added to the top section of the bottom flexible seat pan. Also, the bottom seat pan can be of the sliding type to simulate reclining without the back member pivoting and encroaching into the living space of the passenger behind. Also, the lower section of the lumbar support can articulate by the sliding movement of the bottom seat pan. This feature provides a good passive support to the passive lower back. Dress covers (leather or fabric) can also be attached to the back and bottom flexible diaphragms via hook and loop fastener. It should be understood that all such modifications and improvements have been deleted herein for the sake of conciseness and readability but are properly within the scope of the following claims.

I claim:

1. A cushion-less passenger seat comprising:
   (a) spaced left and right spreaders, each having a front and rear leg with top and bottom ends;
   (b) left and right armrests having distal and proximal ends, said left and right armrest proximal ends pivotally attached to said left and right spreaders respectively, wherein the spreaders are below the proximal ends of said armrests;
   (c) a seating surface for direct contact with a passenger, said seating surface formed from a flexible bottom diaphragm and attached to and extending between said left and right spreaders, said spreaders providing an underlying framework for said seating surface; and
   (d) a lumbar support for direct contact with a passenger and independently pivotable with respect to said seating surface, said lumbar support having lower and upper sections and front and back sides formed from a flexible diaphragm, said lumbar support lower section being attached to and between said left and right spreaders and said lumbar support upper section extending upwardly above said rear legs and said seating surface, whereby said lumbar support upper section is free of direct attachment to said underlying framework.

2. The cushion-less passenger seat of claim 1, further including a headrest attached to and extending upwardly from said lumbar support upper section.

3. The cushion-less passenger seat of claim 2, wherein said combined length of said lumbar support and attached headrest is at least forty-five inches above a floor level having tracks to which said anti-rattle track fittings are attached.

4. The cushion-less passenger seat of claim 1, wherein said armrests have raised positions that extend upwardly parallel with said lumbar support surface and lowered positions that extend parallel with and adjacent to said seating surface.

5. The cushion-less passenger seat of claim 1, further including a seat back food tray having a proximal end pivotally attached to said back side of said lumbar support and having a horizontal position that extends away from said lumbar support back side and an upright position that extends upwardly parallel with said lumbar support.

6. The cushion-less passenger seat of claim 5, wherein said seat back food tray includes a toggle mechanism eliminating the need for a seat back food tray latch.

7. The cushion-less passenger seat of claim 1, further including a literature box attached to and extending upwardly parallel with said lumbar support.

8. The cushion-less passenger seat of claim 1, further including angled struts that attach to and extend downwardly from the top end of said front leg to the bottom end of said rear leg.

9. The cushion-less passenger seat of claim 1, further including a bottom horizontal strut that attaches to and extends between the bottom ends of said front and back legs respectively.

10. The cushion-less passenger seat of claim 1, further including a baggage bar having downwardly extending sections that are attached to said left and right spreaders near points where said rear legs attach to said spreaders and forwardly extending sections that bend around said front legs to extend across the space between said front legs.

11. The cushion-less passenger seat of claim 10, wherein said baggage bar is anodized aluminum.

12. The cushion-less passenger seat of claim 1, further including anti-rattle track fittings that are attachable to the bottom ends of said front and rear legs.

13. The cushion-less passenger seat of claim 1, wherein said rear legs include a plurality of lightening holes located at low mechanical stress points for decreasing the over weight of said seat.

14. The cushion-less passenger seat of claim 1, wherein said rear legs each has an arched and planar shape.

15. The cushion-less passenger seat of claim 1, wherein said front and rear legs are constructed from machined aluminum.

16. A cushion-less passenger seat comprising:
(a) spaced left and right spreaders, each having a front and rear leg with top and bottom ends, wherein said rear legs include a plurality of lightening holes located at low mechanical stress points for decreasing the overall weight of said seat;
(b) left and right armrests having distal and proximal ends, said left and right armrest proximal ends pivotally attached to said left and right spreaders respectively, wherein the spreaders are below the proximal ends of said armrests;
(c) a seating surface for direct contact with a passenger, said seating surface formed from a flexible bottom diaphragm and attached to and extending between said left and right spreaders, said spreaders providing an underlying framework for said seating surface; and
(d) a lumbar support for direct contact with a passenger and independently pivotable with respect to said seating surface, said lumbar support having lower and upper sections and front and back sides formed from a flexible diaphragm, said lumbar support lower section being attached to and between said left and right spreaders and said lumbar support upper section extending upwardly above said rear legs and said seating surface, whereby said lumbar support upper section is free of direct attachment to said underlying framework.

17. The cushion-less passenger seat of claim 16, further including a headrest attached to and extending upwardly from said lumbar support upper section.

18. The cushion-less passenger seat of claim 17, wherein said combined length of said lumbar support and attached headrest is at least forty-five inches above a floor having tracks to which said anti-rattle track fittings are attached.

19. The cushion-less passenger seat of claim 16, wherein said armrests have raised positions that extend upwardly parallel with said lumbar support surface and lowered positions that extend parallel with and adjacent to said seating surface.

20. The cushion-less passenger seat of claim 16, further including a seat back food tray having a proximal end pivotally attached to said back side of said lumbar support and having a horizontal position that extends away from said lumbar support back side and an upright position that extends upwardly parallel with said lumbar support.

21. The cushion-less passenger seat of claim 20, wherein said seat back food tray includes a toggle mechanism eliminating the need for a seat back food tray latch.

22. The cushion-less passenger seat of claim 16, further including a literature box attached to and extending upwardly parallel with said lumbar support.

23. The cushion-less passenger seat of claim 16, further including angled struts that attach to and extend downwardly from the top end of said front leg and the bottom end of said rear leg.

24. The cushion-less passenger seat of claim 16, further including a bottom horizontal strut that attaches to and extends between the bottom ends of said front and back legs respectively.

25. The cushion-less passenger seat of claim 16, further including a baggage bar having downwardly extending sections that are attached to said left and right spreaders near points where said rear legs attach to said spreaders and forwardly extending sections that bend around said front legs to extend across the space between said front legs.

26. The cushion-less passenger seat of claim 25, wherein said baggage bar is anodized aluminum.

27. The cushion-less passenger seat of claim 16, further including anti-rattle track fittings that are attachable to the bottom ends of said front and rear legs.

28. A cushion-less passenger seat comprising:
(a) spaced left and right spreaders, each having a front and rear leg with top and bottom ends including attached anti-rattle track fittings;
(b) left and right armrests having distal and proximal ends, said left and right armrest proximal ends pivotally attached to said left and right spreaders respectively, wherein the spreaders are below the proximal ends of said armrests;
(c) a seating surface for direct contact with a passenger, said seating surface formed from a flexible bottom diaphragm and attached to and extending between said left and right spreaders, said spreaders providing an underlying framework for said seating surface; and
(d) a lumbar support for direct contact with a passenger and independently pivotable with respect to said seating surface, said lumbar support having lower and upper sections and front and back sides formed from a flexible diaphragm, said lumbar support lower section being attached to and between said left and right spreaders and said lumbar support upper section extending upwardly above said rear legs and said seating surface, whereby said lumbar support upper section is free of direct attachment to said underlying framework.

29. The cushion-less passenger seat of claim 28, further including a headrest attached to and extending upwardly from said lumbar support upper section.

30. The cushion-less passenger seat of claim 29, wherein said combined length of said lumbar support and attached headrest is at least forty-five inches.

31. The cushion-less passenger seat of claim 28, wherein said armrests have raised positions that extend upwardly parallel with said lumbar support surface and lowered positions that extend parallel with and adjacent to said seating surface.

32. The cushion-less passenger seat of claim 28, further including a seat back food tray having a proximal end pivotally attached to said back side of said lumbar support and having a horizontal position that extends away from said lumbar support back side and an upright position that extends upwardly parallel with said lumbar support.

33. The cushion-less passenger seat of claim 28, further including a literature box attached to and extending upwardly parallel with said lumbar support.

34. The cushion-less passenger seat of claim 28, further including angled struts that attach to and extend downwardly from the top end of said front leg and the bottom end of said rear leg.

35. The cushion-less passenger seat of claim 28, further including a bottom horizontal strut that attaches to and extends between the bottom ends of said front and back legs respectively.

36. The cushion-less passenger seat of claim 28, further including a baggage bar having downwardly extending sections that are attached to said left and right spreaders near points where said rear legs attach to said spreaders and forwardly extending sections that bend around said front legs to extend across the space between said front legs.

37. The cushion-less passenger seat of claim 26, wherein said baggage bar is anodized aluminum.

38. The cushion-less passenger seat of claim 28, wherein said rear legs include a plurality of lightening holes located at low mechanical stress points for decreasing the over weight of said seat.

39. The cushion-less passenger seat of claim 28, wherein said rear legs each has an arched and planar shape.

40. The cushion-less passenger seat of claim 28, wherein said front and rear legs are constructed from machined aluminum.

41. The cushion-less passenger seat of claim 28, wherein said seat back food tray includes a toggle mechanism eliminating the need for a seat back food tray latch.

* * * * *